Patented Feb. 12, 1946

2,394,815

UNITED STATES PATENT OFFICE 2,394,815

PLASTICIZED COMPOSITION

Frank J. Soday, Swarthmore, Pa., assignor to The United Gas Improvement Company, a corporation of Pennsylvania No Drawing. Application July 7, 1942, Serial No. 450,080

11 Claims. (Cl. 260—36)

This invention relates to new compositions of matter comprising natural and/or synthetic rubber and one or more monohydric alcohol esters of tetrahydrophthalic acid and/or substituted tetrahydrophthalic acid.

More particularly, this invention pertains to rubber compositions comprising a mixture of one or more natural and/or synthetic rubbers or elastomers and one or more monohydric alcohol esters of tetrahydrophthalic acid and/or substituted tetrahydrophthalic acid.

An object of the invention is to provide natural and/or synthetic rubber compositions suitable for use as tire or tube stocks; for molding purposes; for the fabrication of printers rolls, hose, sheets, tubes, gaskets, and other objects and specialties; for the preparation of adhesives and cements; and for coating, impregnating, waterproofing, and other specialized uses; comprising one or more natural and/or synthetic rubbers and/or elastomers and one or more monohydric alcohol esters of tetrahydrophthalic acid and/or substituted tetrahydrophthalic acids, with or without the incorporation of other additives selected from a list comprising sulfur, accelerators, pigments, resins, antioxidants, fillers, extenders, and/or other plasticizing and/or softening agents, such as stearic acid, pine oil and pine tar.

Another object of the invention is the use of monohydric alcohol esters of tetrahydrophthalic acid or substituted tetrahydrophthalic acids in conjunction with other ingredients, such as resins, resinous materials, plastic products, and dibutyl phthalate or other high boiling organic compounds, as softening and/or plasticizing oils for natural and/or synthetic rubber. Other objects and advantages of the invention will be apparent to those familiar with the art upon an inspection of the specification and claims.

A considerable number of the softening and/or plasticizing agents employed in rubber compounds, and particularly synthetic rubber compounds, at the present time suffer from many disadvantages, among which is their lack of compatibility with natural and, more particularly, with synthetic rubber. This lack of compatibility renders it extremely difficult to obtain a uniform mixture or dispersion of the softener in the rubber compound, resulting in the production of non-uniform objects or products. In addition, the use of such softening agents frequently results in the leafing or lamination of the rubber compound during the mastication or calendering process. Finally, the incorporation of such incompatible softeners in rubber compounds results in the production of finished objects which frequently exhibit bleeding or blooming during use.

I have discovered that the monohydric alcohol esters of tetrahydrophthalic acid and/or substituted tetrahydrophthalic acids are unusually well adapted for use as softening agents for natural and/or synthetic rubber. Particularly desirable results are obtained when such esters are incorporated in synthetic rubber compositions.

The excellent results obtained when esters of the type described herein are used as plasticizing and/or softening agents for natural and/or synthetic rubber are largely due to the pronounced solubility characteristics of such esters, and their excellent compatibility with natural and/or synthetic rubbers and elastomers. This enables each mill to operate at maximum throughput, with a very substantial saving in power.

The use of such esters in natural and/or synthetic rubber compounding results in the production of uniform compounds and finished articles remarkably free from bleeding, blooming, leafing, or lamination.

In addition, the low viscosity characteristics of esters of the type described greatly assists in the milling and blending operations, and insures rapid and complete penetration. Uniform stocks possessing good calendering and milling characteristisc are thus obtained.

Esters of the type described are quite stable and strongly resistant to thermal decomposition, thus insuring the production of uniform compounds and finished articles free from decomposition products. Such compounds, and the finished articles prepared therefrom, possess very good aging characteristics.

These esters also contain substantially no free carbon or other extraneous materials. This is of considerable importance from the standpoint of the preparation of clean, uniform rubber compounds and finished articles, and from the standpoint of smooth, trouble-free mill operation.

An outstanding characteristic of monohydric alcohol esters of tetrahydrophthalic acid and/or substituted tetrahydrophthalic acids is the presence of a potentially reactive double bond in such compounds. This renders the compounds potentially vulcanizable, that is, they may react with sulfur during the vulcanizing process. Whether such reaction takes place, and the nature and extent to which it occurs, depends upon the conditions employed during the vulcanizing process, such as the temperature, pressure, type and quantity of vulcanizing agent and/or sulfur addition compound employed, quantity of sulfur employed (if any), and the like.

Under certain conditions, the molecules of esters of the type described herein may react with sulfur, or other vulcanizing agents, in such a way as to become attached to other molecules of the same, or different, type. Thus, for example, molecules of esters of the type described herein may unite to form chains comprising two, or more, ester molecules united by means of sulfur bridges. These chains, in turn, may be attached to one or more rubber molecules by means of sulfur bridges, or individual ester molecules may be so attached, or otherwise.

By a choice of the proper reaction conditions, rubber compositions possessing almost any desired property may be obtained readily. Thus, products ranging from very soft, mildly cured types to the so-called hard rubbers may be obtained at will.

Esters of the type desired may be regarded as derivatives of an acid having the following structural formula

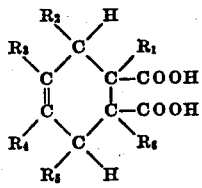

in which each of the group consisting of $R_1$, $R_2$, $R_3$, $R_4$, $R_5$, and $R_6$ is either an alkyl group or a hydrogen atom, or two of the groups together, such as $R_2$ and $R_3$ may stand for a methylene ($—CH_2—$) group.

Monohydric alcohol esters of this acid may be represented as follows

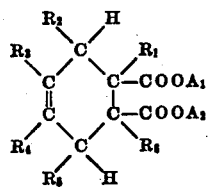

in which each of the group consisting of $R_1$, $R_2$, $R_3$, $R_4$, $R_5$, and $R_6$ is either an alkyl group or a hydrogen atom, or two of the groups together stand for a methylene group, $A_1$ represents one of a group consisting of alkyl, substituted alkyl, aryl, substituted aryl, alkyl-aryl, substituted alkyl-aryl, aryl-alkyl, and substituted aryl-alkyl group, and $A_2$ represents one of a group consisting of hydrogen, alkyl, substituted alkyl, aryl, substituted aryl, alkyl-aryl, substituted alkyl-aryl, aryl-alkyl, and substituted aryl-alkyl group.

Examples of such esters are esters of tetrahydrophthalic acid,

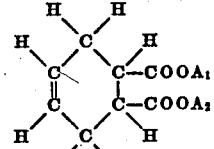

esters of 3-methyl-Δ4-tetrahydrophthalic acid,

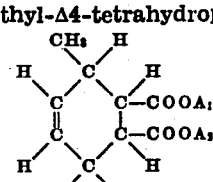

esters of 4-methyl-Δ4-tetrahydrophthalic acid,

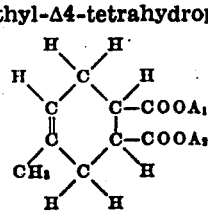

and esters of 3,6 endomethylene tetrahydrophthalic acid,

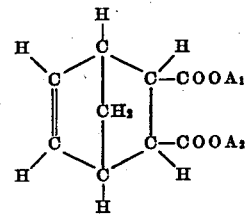

in which $A_1$ and $A_2$ have the same values as before.

In the claims, the term "a tetrahydrophthalic acid" is intended to include acids of the type above described.

The acids from which such esters may be derived may be obtained in any desired manner, such as by the reaction of one or more diolefines with maleic anhydride, or derivatives or substituents thereof. Examples of suitable diolefines are butadiene, isoprene, piperylene, and cyclopentadiene. Light oil fractions are a particularly desirable source of such diolefines, and such fractions may contain more than one diolefine, if desired.

These acids and/or anhydrides may be reacted with alcohols, or derivatives or substituents thereof, in any desired manner. Examples of suitable alcohols are methyl, ethyl, propyl, butyl, amyl, and similar alcohols.

It is to be understood, of course, that more than one acid and/or more than one alcohol may be reacted. Mixed esters possessing a wide range of physical properties may be obtained in this way, enabling rubber plasticizers of the exact type required for the production of a desired composition to be produced at will.

Examples of the rubber or rubber-like materials with which esters of the type described herein may be compounded are the various grades and types of natural rubber and rubber-like materials, and synthetic rubbers or elastomers, such as, for example, those obtained by the polymerization of one or more diolefines, or substituents thereof, such as butadiene, isoprene, piperylene, 2-chlorobutadiene, and the like, either alone, or in admixture, or in combination with one or more unsaturated and/or reactive compounds or materials such as olefines, unsaturated nitriles, acids, esters, ethers, ketones, aldehydes, and/or substituents thereof, such as, for example, styrene, acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines. These materials are known in the art under different trade names, such as, for example, Buna, Buna S, Buna N or Perbunan, neoprene, Ameripol, Hycar, Butyl rubber, and the like.

Synthetic rubbers of the type obtained by the reaction of dihalides with organic or inorganic sulfides or polysulfides also are included, such as, for example, the material prepared by the reaction of ethylene dichloride with sodium tetrasulfide and sold under the trade name, Thiokol.

The quantity of esters of the type described herein which may be incorporated in natural or synthetic rubbers, or elastomers, may be varied over very wide limits, depending upon the properties desired. Thus, for example, quantities varying from a few percent, or less, to an amount equal to, or greater than, the quantity of rubber, or rubber mixture, employed in the composition, may be used.

In addition to esters of the type described herein, other ingredients which may be incorporated in natural rubber and/or synthetic rubber compositions include vulcanizing agents and/or accelerators, such as, for example, sulfur or sulfur-containing compounds such as tetramethyl-thiuram disulfide, mercaptoarylenethiazoles, such as mercaptobenzothiazole, benzothiazyl disulfide, litharge, and dithio carbamates; pigments, such as, for example, magnesium oxide, zinc oxide, and lead oxide; antioxidants, such as, for example, phenyl-alpha-naphthylamine (Neozone A), and phenyl-beta-naphthylamine (Neozone D); reinforcing pigments, such as, for example, carbon blacks, such as channel black, clay, and blanc fixe; fillers and/or diluents, such as, for example, lithopone, barytes, whiting, and asbestine; other softeners and plasticizing agents such as, for example, paraffin wax, factice, dibutyl phthalate, tricresyl phosphate, pine oil, oils, fatty acids, and synthetic or natural resins or resinous materials.

A preferred embodiment of the invention is the use of esters of the type described in conjunction with resins, such as those derived by the polymerization of light oil and/or coal tar fractions containing coumarone and/or indene or the resins derived by the polymerization of the high-boiling monomeric material derived from tar by flash distillation and/or solvent extraction processes, and/or other organic liquids, such as the high boiling aromatic oils derived by the flash distillation and/or solvent extraction of tar, as softening agents for natural and/or synthetic rubber.

Reclaimed rubber is also included among the materials which may be plasticized with the esters herein described, together with natural and/or synthetic rubber, and with or without other ingredients.

The ester or esters, and other ingredients, may be mixed or compounded with the natural rubber and/or synthetic rubber on mixing, compounding, and/or calendering rolls, or they may be compounded by any other method known in the art. The rubber composition then may be vulcanized, if desired, by any of the methods employed for this purpose in the art.

Examples of rubber compositions containing esters of the type described herein are as follows:

Example 1

| Component: | Parts by weight |
|---|---|
| Natural rubber | 100 |
| Butyl ester of tetrahydrophthalic acid | 10 |
| Zinc oxide | 5 |
| Sulfur | 2.5 |
| Mercaptobenzothiazole | 0.8 |

Example 2

| Component: | Parts by weight |
|---|---|
| Pale crepe rubber | 100 |
| Zinc oxide | 45 |
| Sulfur | 2.5 |
| Resin obtained from monomeric material boiling above 210° C. and isolated from petroleum tar | 5 |
| Butyl ester of 3-methyl-Δ4-tetrahydrophthalic acid | 5 |
| Mercaptobenzothiazole | 0.6 |

Example 3

A natural rubber tire tread mix may be compounded as follows:

| Component: | Parts by weight |
|---|---|
| Smoked sheet rubber | 100 |
| Channel black | 40 |
| Zinc oxide | 6 |
| Butyl ester of 4-methyl-Δ4-tetrahydrophthalic acid | 2 |
| Resin obtained from monomeric material boiling above 210° C. and isolated from petroleum tar | 2 |
| Sulfur | 3 |
| Mercapto benzothiazole | 0.7 |

Example 4

A synthetic rubber tire tread mix may be compounded as follows:

| Component: | Parts by weight |
|---|---|
| Neoprene | 100 |
| Zinc oxide | 5 |
| Mercaptobenzothiazole | 1.25 |
| Channel black | 45 |
| Amyl ester of 3,6-endomethylene tetrahydrophthalic acid | 4 |
| Phenyl-alpha-naphthylamine | 2 |
| Sulfur | 1.25 |

Example 5

| Component: | Parts by weight |
|---|---|
| Butadiene-styrene rubber | 100 |
| Butyl ester of tetrahydrophthalic acid | 3 |
| Resin obtained from monomeric material boiling above 210° C. and isolated from petroleum tar | 3 |
| Carbon black | 40 |
| Sulfur | 1.25 |
| Mercaptobenzothiazole | 1.25 |
| Zinc oxide | 5 |
| Phenyl-alpha-naphthylamine | 1 |

Example 6

| Component: | Parts by weight |
|---|---|
| Butadiene-acrylic nitrile rubber | 100 |
| Butyl ester of 4-methyl-Δ4-tetrahydrophthalic acid | 2 |
| Resin obtained from monomeric material boiling above 210° C. and isolated from petroleum tar | 3 |
| Carbon black | 30 |
| Sulfur | 1.5 |
| Mercaptobenzothiazole | 1.5 |
| Zinc oxide | 15 |
| Phenyl-alpha-naphthylamine | 2 |

Example 7

| Component: | Parts by weight |
|---|---|
| Butadiene-isobutylene rubber | 100 |
| Butyl ester of tetrahydrophthalic acid | 5 |
| Resin obtained from monomeric material boiling above 210° C. and isolated from petroleum tar | 15 |
| Carbon black | 15 |
| Sulfur | 1.25 |
| Mercaptobenzothiazole | 1.25 |
| Phenyl-alpha-naphthylamine | 1 |
| Zinc oxide | 20 |

The foregoing compositions may be sheeted out, shaped and vulcanized, if desired, such as by the application of a temperature of, say, 140° C. in a press for a period of, say, 45 minutes. Other procedures may, of course, be used if desired.

Rubber-ester compositions of the type described, either as such or with the incorporation of other ingredients such as the resin and/or aromatic oil derived from monomeric material boiling above 210° C. and isolated from petroleum tar, may be used for a variety of purposes, such as for the manufacture of tires, tubes, and other objects, and as adhesives, coating, impregnating, and waterproofing agents. Such compositions may or may not be vulcanized prior to, during, or subsequent to the use thereof.

In the claims the term "monohydric alcohol ester" is intended to mean an ester identical with that obtained by reacting the acid or anhydride in question with a monohydric alcohol, whether the ester is so produced or not.

While various procedures and formulas have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention, which is intended to be limited only as required by the prior art.

I claim:

1. A composition comprising rubber selected from the group consisting of natural rubber and rubber-like polymers of butadiene, isoprene, piperylene and 2-chlorobutadiene, and from 2 to 100% based on said rubber of a monohydric alcohol ester of a tetrahydrophthalic acid.

2. A composition comprising rubber selected from the group consisting of natural rubber and rubber-like polymers of butadiene, isoprene, piperylene and 2-chlorobutadiene, and from 2 to 10% based on said rubber of a monohydric alcohol ester of a tetrahydrophthalic acid.

3. A composition comprising rubber selected from the group consisting of natural rubber and rubber-like polymers of butadiene, isoprene, piperylene and 2-chlorobutadiene, and from 2 to 100% based on said rubber of an alkyl ester of a tetrahydrophthalic acid.

4. A composition comprising rubber selected from the group consisting of natural rubber and rubber-like polymers of butadiene, isoprene, piperylene and 2-chlorobutadiene, and from 2 to 10% based on said rubber of an alkyl ester of a tetrahydrophthalic acid in which the characterizing alkyl group has less than six carbon atoms.

5. A composition comprising rubber-like copolymer of butadiene and styrene, and from 2 to 100% based on said copolymer of an alkyl ester of a tetrahydrophthalic acid.

6. A composition comprising rubber-like copolymer of butadiene and styrene, and from 2 to 10% based on said copolymer of an alkyl ester of a tetrahydrophthalic acid in which the characterizing alkyl group has less than six carbon atoms.

7. A composition comprising rubber-like copolymer of butadiene and acrylic nitrile, and from 2 to 100% based on said copolymer of an alkyl ester of a tetrahydrophthalic acid.

8. A composition comprising rubber-like copolymer of butadiene and acrylic nitrile, and from 2 to 10% based on said copolymer of an alkyl ester of a tetrahydrophthalic acid in which the characterizing alkyl group has less than six carbon atoms.

9. A composition comprising rubber selected from the group consisting of natural rubber and rubber-like polymers of butadiene, isoprene, piperylene and 2-chlorobutadiene, and from 2 to 10% based on said rubber of butyl ester of tetrahydrophthalic acid.

10. A composition comprising rubber-like copolymer of butadiene and styrene, and from 2 to 10% based on said copolymer of butyl ester of 3-methyl-Δ4-tetrahydrophthalic acid.

11. A composition comprising rubber-like copolymer of butadiene and acrylic nitrile, and from 2 to 10% based on said copolymer of butyl ester of 3-methyl-Δ4-tetrahydrophthalic acid.

FRANK J. SODAY.